United States Patent [19]
Bernard et al.

[11] Patent Number: 5,497,259
[45] Date of Patent: Mar. 5, 1996

[54] LOCAL AREA NETWORK WITH OPTICAL TRANSMISSION

[75] Inventors: Jean-Jacques Bernard, Vert le Grand; Fabrice Pitel, Etrechy; Patrice Comte, Bezons, all of France

[73] Assignee: Cegelec, Levallois Perret, France

[21] Appl. No.: 322,336

[22] Filed: Oct. 13, 1994

[30] Foreign Application Priority Data

Oct. 14, 1993 [FR] France .................... 93 12225

[51] Int. Cl.$^6$ ............................ H04B 10/20; H04J 14/00
[52] U.S. Cl. ............................ 359/118; 359/120; 359/121
[58] Field of Search ........................ 359/118, 119, 359/120, 121, 125, 173; 370/85.5

[56] References Cited

U.S. PATENT DOCUMENTS

| | | | |
|---|---|---|---|
| 4,781,427 | 11/1988 | Husbands et al. | 359/173 |
| 4,947,389 | 8/1990 | Eng et al. | 370/85.5 |
| 5,221,983 | 6/1993 | Wagner | 359/118 |
| 5,301,050 | 4/1994 | Czerwiec et al. | 359/125 |

FOREIGN PATENT DOCUMENTS

| | | | |
|---|---|---|---|
| 2175774 | 12/1986 | United Kingdom | 359/119 |
| 2224901 | 5/1990 | United Kingdom | 359/120 |

OTHER PUBLICATIONS

French Search Report FR 9312225.

Primary Examiner—Leo Boudreau
Assistant Examiner—Bhavesh Mehta
Attorney, Agent, or Firm—Sughrue, Mion, Zinn, Macpeak & Seas

[57] ABSTRACT

Each node (N1) of the network is connected to each of the subscriber sets (P1-1) that are associated with the node via a single optical fiber (FP1-1) on two different wavelengths. The node is connected to each of certain other nodes via a single fiber (FN1-2) on a single wavelength. In the node, the electrical signals are supplied by two optical receivers (2, 6) and are transmitted via amplifiers (8, 10) to a single transmitter (4). A passive directional coupler (22) and a wavelength separator (20) provide the necessary optical connections. Passive optical dividers (24, 26) form two interfaces with the sets and with the other nodes. The invention is applicable in particular to industrial transmission networks.

9 Claims, 2 Drawing Sheets

LOCAL AREA NETWORK WITH OPTICAL TRANSMISSION

BACKGROUND OF THE INVENTION

The present invention relates to a local area network with optical transmission. It is known that, in an industrial installation, a local area network provides links between sensors and/or actuators and automation systems such as controllers, programmable or otherwise, or regulators, etc. Such sensors, actuators, and systems constitute subscribers to the network. The data transmitted by a subscriber is typically transmitted to all of the other subscribers via optical fibers and via active optical star couplers performing optical coupling and constituting nodes of the network.

Frames carrying the data are transmitted at a data rate that is typically equal to 2.5 Mbit/s. Consideration is being given to raising the data rate to 5 or 10 Mbit/s.

A family of known local area networks is described in French Standard UTE C 46-607:

"FIP bus for performing data interchange between transmitters, actuators, and controllers—Base-band physical layer on optical fiber".

A local area network of this known family includes the following elements which, with respect to their functions indicated below, are common to a local area network of the present invention:

Terminal sets capable of transmitting and receiving optical signals. Such sets are in particular subscriber sets, each of which is connected, e.g. electrically, and assigned to a subscriber.

Nodes constituted by active star couplers.

Primary fibers optically connecting each of the nodes to sets associated with the node.

Secondary fibers optically connecting each of the nodes to other ones of the nodes which are thus connected directly to the node. By means of the secondary fibers, each of the nodes is connected at least indirectly to all of the others. Via the fibers to which it is connected, each node is capable of receiving an incoming optical signal carrying data, and of responding by transmitting corresponding outgoing optical signals carrying the data to all of the associated sets and to all of the nodes connected directly to the node. For that purpose, the node includes optoelectrical transducers and electrical amplifiers. More precisely, for each association of an incoming optical signal and of a corresponding outgoing optical signal, the node includes:

a receive transducer for transforming the incoming optical signal into an electrical reception signal;

an amplifier for amplifying the electrical signal; and a transmit transducer for transforming the amplified electrical signal into an outgoing optical signal.

Each receive transducer or transmit transducer is referred to below as either a "primary" transducer if the optical signal is transmitted via a primary fiber, or a "secondary" transducer if the signal is transmitted via a secondary fiber.

Within the above known family, a local area network is characterized in particular by a wavelength which constitutes the wavelength of the network and to which all of the transducers of the network are tuned. Each node is connected to each of the sets that are associated with it via two optical fibers connected to respective ones of two primary transducers of the node, one of which transducers is a transmit transducer, the other transducer being a receive transmitter, and both transducers being assigned exclusively to the set.

For that purpose, the node includes a primary transmit transducer and a primary receive transducer for each of the sets that are associated with the node.

Each direct connection between two nodes of the network is provided by two secondary fibers which are assigned exclusively to interconnecting the two nodes. A first fiber guides the incoming signals of a first node and the outgoing signals of the second node. The second fiber guides the outgoing signals of the first node and the incoming signals of the second node. The outgoing signals of the first node (or of the second node) are transmitted via a secondary transmit transducer of the first (or of the second) node, and are received via a secondary receive transducer of the second (or of the first) node, the two transducers being assigned exclusively to interconnecting the two nodes. For that purpose, each node includes a secondary transmit transducer, and a secondary receive transducer for each other node connected directly to the node.

Such a known network suffers from the drawback that, even if the elements used to make up the network are as well chosen as possible, the number of subscribers that can be interconnected appears too limited to satisfy the needs of industry. Moreover, its cost is high.

SUMMARY OF THE INVENTION

Particular objects of the present invention are to increase the number of subscribers connected to a local area network, and/or to reduce the cost of such a network.

To these ends, the receive primary transducers and the transmit primary transducers of a network of the invention are tuned to two different respective wavelengths;

a single primary fiber connects each set to the associated node;

the receive secondary transducers and the transmit secondary transducers are tuned to one of the two wavelengths constituting a common wavelength;

a single secondary fiber interconnects two nodes when the two nodes are connected together directly; and means are provided so that, when a first node transmits an optical signal over the secondary fibers, an optical signal transmitted in response by a second node cannot interfere with the operation of the first node.

For example, such means include buffer memories disposed in each node so that, when the node receives a signal, it can wait before re-transmitting the signal for long enough so that the re-transmitted signal cannot interfere with the received signal.

Preferably, each node includes a common transducer tuned to the common wavelength, and constituting both a primary transducer and a secondary transducer.

A description is given below with reference to the accompanying drawings of how the present invention may be implemented, it being understood that the elements and dispositions mentioned and shown are given by way of non-limiting example only. When the same element is shown in more than one figure, it is given the same reference.

DETAILED DESCRIPTION OF THE PREFERRED EMBODIMENT

Figure 1:
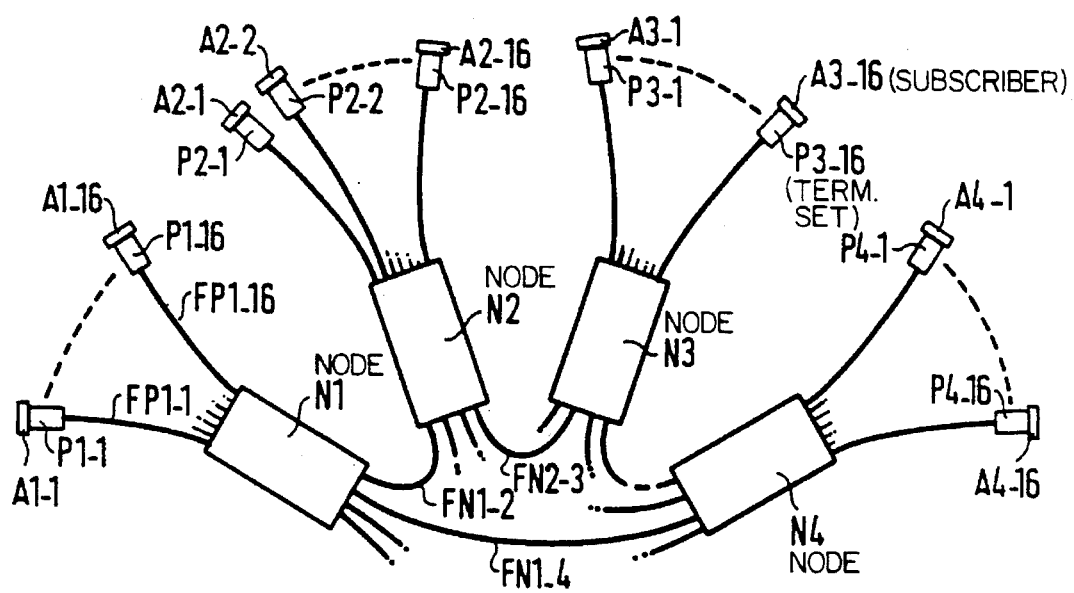
FIG. 1 is a fragmentary view of a first network of the invention.
Figure 2:
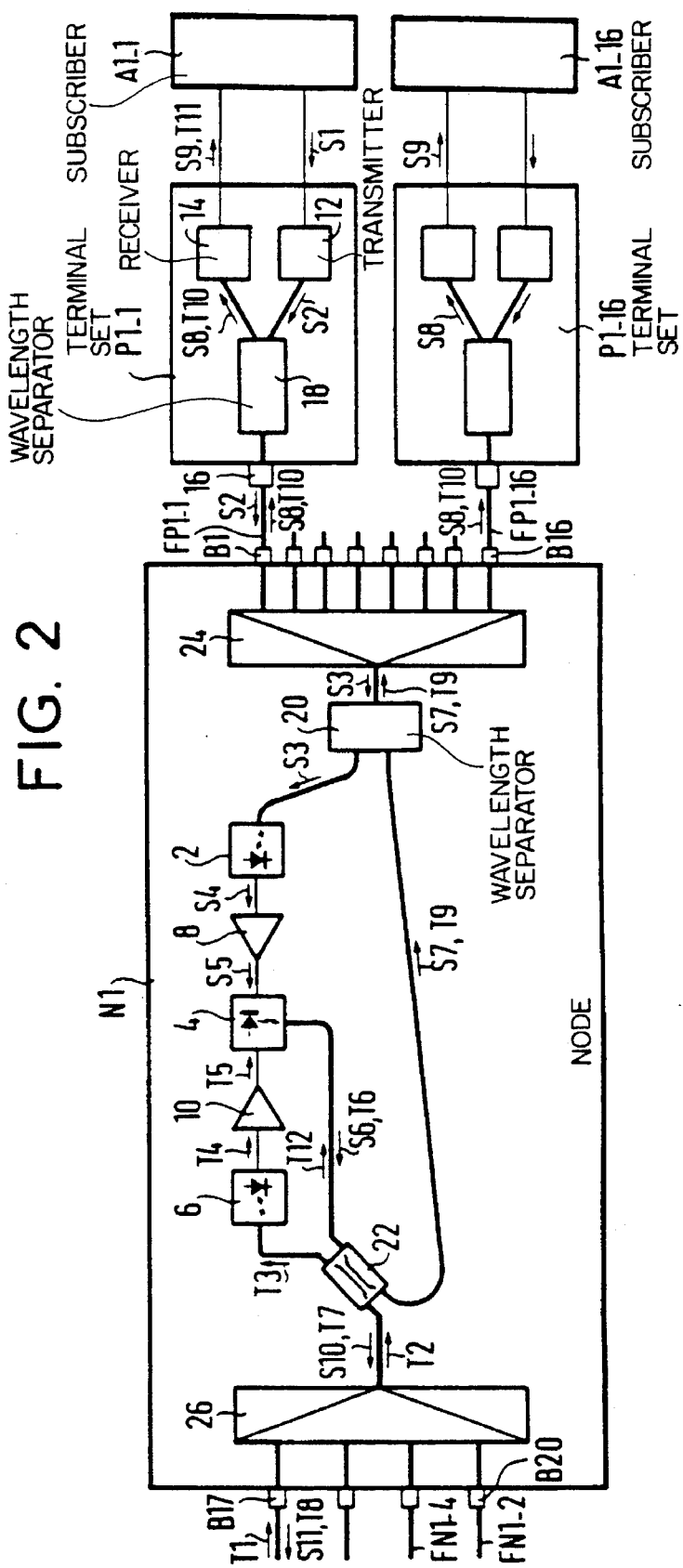
FIG. 2 is a view of a node and of two subscriber sets of the network.

As shown in FIGS. 1 and 2, a network of the invention has a known basic disposition which is described firstly below:

In compliance with this disposition, the network includes a plurality of terminal sets P1-1 . . . P4-16 each provided with an optical connection terminal 16. Each of the sets includes:

a transmitter 12 capable of receiving an input signal S1 carrying data and of responding by supplying a message S2 including the data and transmitted by the set; and a receiver 14 for processing a message S8, T10 including data and received by the set, the receiver being capable of responding by supplying an output signal S9, T11 including the data.

The sets are distributed in a plurality of groups of sets, e.g. such as groups P1-1 . . . P1-16 . . . P2-1 . . . P2-16, each group comprising at least one set, e.g. 16 sets. Most of the sets are subscriber sets P1-1 . . . P1-16, P2-2 . . . P4-16 connected to respective subscribers A1-1 . . . A1-16, A2-2 . . . A4-16 outside the network. Each subscriber A1-1 connected to a set P1-1 can include data to be transmitted to the other subscribers in an input signal S1 of the set. Each subscriber connected to a set can also receive the output signals S9, T11 of the set so as to use the data therefrom. The input signals and the output signals of the subscriber sets respectively constitute input signals and output signals of the network.

A management member A2-1 is connected to the subscriber sets so that, at any given time, only one of the sets is allowed to transmit a message. For example, the management member may constitute one of the sets of the network. It is then connected to the subscriber sets in the same manner as the subscriber sets are interconnected. This manner is indicated below.

A plurality of nodes N1 . . . N4 are associated with respective ones of said groups of sets, each node N1 associated with a group of sets P1-1 . . . P1-16 also being associated with the sets in the group. Such a node includes the following elements:

Primary connection terminals B1 . . . B16 for enabling messages to be interchanged between the node and the associated sets. These messages are referred to as "primary" messages, and the primary messages are further referred to either as "incoming" messages, such as message S2, or as "outgoing" messages, such as messages S8 and T10, depending on whether they are received or transmitted by the node.

At least two secondary connection terminals B17 . . . B20 for enabling messages to be interchanged between the node and other nodes N2 . . . N4. These messages are referred to as "secondary" messages, and either as "incoming" messages, such as message T1, or as "outgoing" messages, such as messages S11 and T8 depending on whether they are received or transmitted by the node. The primary and secondary, incoming and outgoing messages are in the form of optical signals constituted by modulations in optical carrier waves, and the wavelengths of the carrier waves constituting the respective wavelengths of the messages.

Amplifiers 8, 10 for receiving electrical reception signals S4, T4, and for responding by supplying amplified electrical signals S5, T5.

Optoelectronic transducers. Each of the transducers may be a receive transducer. Such is the case for transducers 2 and 6, each of which transfers data from an optical signal S3 or T3 coming from a terminal B1 or B17 to an electrical reception signal S4 or T4 supplied to an amplifier 8 or 10. Each of the transducers may also be a transmit transducer. Such is the case for transducer 4 which transfers data from an amplified electrical signal S5 or T5 coming from an amplifier 8 or 10 to an optical signal S6 or T6 supplied to a terminal B1, B16, or B17. The transducer is at the same time either a primary transducer or a secondary transducer depending on whether the terminal is a primary terminal or a secondary terminal. All of the transducers enable the outgoing messages to be formed from the incoming messages.

Each transmitter or receiver of a set and each transducer of a node is tuned to a wavelength which is that of the optical signals whereby it transfers the data.

Primary optical fibers FP1-1 . . . FP1-16 connect the optical terminals 16 of the sets P1-1 . . . P1-16 of each group of sets to respective ones of the primary terminals B1 . . . B16 of the node N1 associated with the group of sets, so that the messages transmitted by the sets constitute the incoming primary messages of the node and so that the outgoing primary messages of the node are received by the sets.

Each one of secondary optical fibers such as FN1-2, or FN1-4 interconnects two secondary terminals belonging to respective ones of two nodes such as N1 and N2 or N4 so that the outgoing secondary messages of one of the nodes constitute the incoming secondary messages of the other node.

In a more particular first disposition of the present invention, described firstly below in general terms, the incoming primary messages S2 and the outgoing primary messages S8, T10 respectively have a first wavelength of the network and a second wavelength of the network. The two wavelengths are different and one of them constitutes a common wavelength. The incoming secondary messages T1 and the outgoing secondary messages S11, T8 have the common wavelength.

Each set such as P1-1 includes:

an optical terminal 16; and a wavelength separator 18 connecting the terminal both to the transmitter 12 of the set for the first wavelength, and also to the receiver 14 of the set for the second wavelength. The set further includes electronic management circuits and memories for communicating with the subscriber which is connected to it, and for verifying, once it has transmitted a message, that it has in fact received a return message, correctly reproducing the transmitted message, from the associated node. If such a return message is not received, the set transmits the same message again. Other dispositions known per se and not described herein are used to limit the damaging consequences of a failure of an element of the network.

The node N1 associated with the set includes the following elements:

A primary terminal B1 associated with the set and connected to the optical terminal 16 of the set via one of said primary fibers FP1-1.

A wavelength separator 20.

A primary receive transducer 2 tuned to the first wavelength and connected to the primary terminal B1 via the separator 20 for the first wavelength.

A primary transmit transducer 4 tuned to the second wavelength and connected to the primary terminal via the separator for the second wavelength. That one of the two primary transducers which is tuned to the common wavelength is constituted by a "common" transducer 4 whose functions are specified below. The other of the two primary transducers constitutes an assigned transducer assigned to the primary messages 2.

A passive optical coupler 22.

A secondary receive transducer 6 tuned to the common wavelength and optically connected to a secondary terminal B17 via the passive coupler 22.

A secondary transmit transducer 6 tuned to the common wavelength and optically connected to a secondary terminal B17 via the passive coupler 22. The common transducer also constitutes one of the two secondary transducers. More precisely, the common transducer constitutes either both the primary and the secondary transmit transducers, which is the case for transducer 4 shown in FIGS. 2 and 3, or else both the primary and secondary receive transducers, which is the case for transducer 104 in FIG. 4. The other of the two secondary transducers constitutes an assigned transducer assigned to the secondary messages, such as 6 and 106. The common transducer 4 or 104 is electrically connected to the two assigned transducers 2 and 6, or 102 and 106 via respective ones of two amplifiers 8 and 10, or 108 and 110.

Other advantageous dispositions for the networks given by way of example are described below:

The passive coupler 22 has two pairs of terminals 30, 32 and 34, 36 (see FIG. 3) and is capable of receiving an optical signal at at least one terminal of each of the pairs, and of then splitting the signal so as to restore it in part at each of the two terminals of the other pair. The common transducer 4 is then optically connected to said primary terminal B1 of the node N1 via the passive coupler and the wavelength separator 20 in series so as to enable optical signals to be transmitted between the transmitter and the terminal.

The wavelength separator 20 connects the common transducer 4 and the assigned transducer assigned to the primary messages 2 to a plurality of primary terminals B1 . . . B16 of the node N1 simultaneously and preferably to all of the primary terminals thereof via a primary passive optical divider 24.

The passive coupler 22 connects the common transducer 4 and the assigned transducer assigned to the secondary messages 6 to a plurality of the secondary terminals B17 . . . B20 of said node N1 and preferably to all of the secondary terminals thereof via a secondary passive optical coupler 26.

The above three dispositions make it possible for the node N1 to include three transducers only: the common transducer 4, the assigned transducer assigned to the primary messages 2, and the assigned transducer assigned to the secondary messages 6.

In the typical case in which the secondary fibers FN1-2, FN1-10, F2-3, FN2-4 are longer than the primary fibers and must attenuate only as little as possible the secondary messages, the choice of the wavelengths and of the materials of the fibers is preferably such that the secondary fibers have a lower coefficient of absorption for said common wavelength than for the other wavelength of the network. For example, the common wavelength is 1,300 nm, with the other wavelength of the network being 800 nm. The primary fibers are chosen so as to have low coefficients of absorption at both of the wavelengths.

Figure 3:
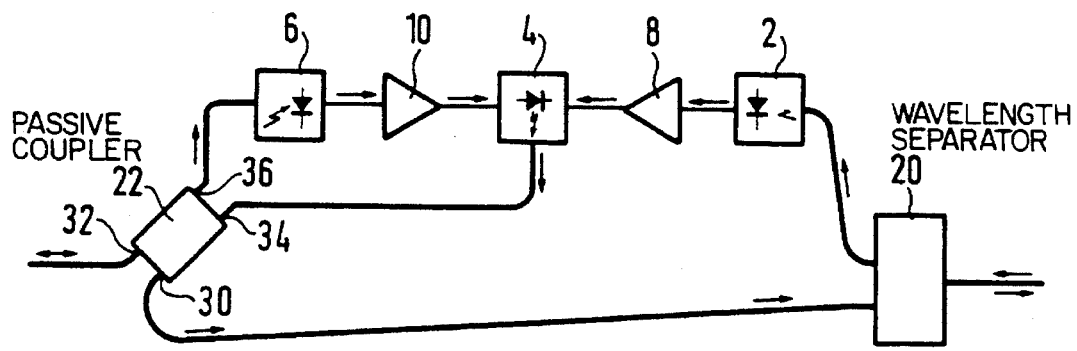
FIG. 3 is a simplified view of the node shown in FIG. 2.
Figure 4:
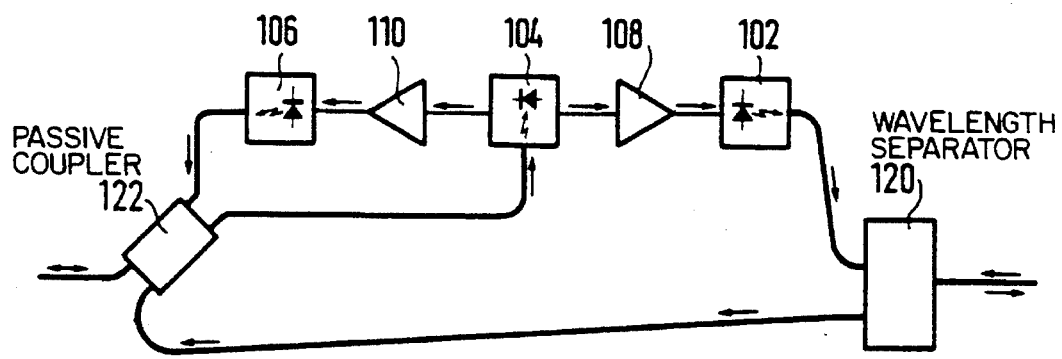
FIG. 4 is a simplified view of a node of a second network of the invention.

As shown in the simplified diagrams in FIGS. 3 and 4, the nodes of both the first and the second networks of the invention have analogous elements disposed in compliance with two identical architectures. Each element of the second network is referenced by a reference numeral which is the reference numeral of the analogous element of the first network increased by 100.

The differences between the two networks are as follows:

The common transducer is a transmit transducer 4 in the first network, whereas it is a receive transducer 104 in the second network.

The assigned transducers assigned to the primary and the secondary messages are receive transducers 2 and 6 in the first network, whereas they are transmit transducers 102 and 106 in the second network.

the propagation directions of the optical signals and of the electrical signals between the wavelength separator 20 of 120 and the passive coupler 22 or 122 are inverted from one network to the other, as are the connection directions of the amplifiers 8 or 108, and 10 or 110.

What is claimed is:

1. A local area network with optical transmission including:

a plurality of terminal sets (P1-1 . . . P4-16) for transmitting and receiving optical signals;

a plurality of nodes (N1 . . . N4), connected to respective ones of said terminal sets, for transmitting and receiving said optical signals;

a plurality of primary fibers (FP1-1 . . . FP1-16) optically connecting each of said nodes (N1) to a respective one of said terminal sets (P1-1 . . . P1-1);

a plurality of secondary fibers (FN1-4) optically connecting each of said nodes (N1) to others of said nodes such that each of said nodes is connected at least indirectly to all of the others of said nodes;

each of said nodes (N1) receiving an incoming optical signal (S2, T1), carrying data via one of said primary or said secondary fibers, and responding by transmitting corresponding outgoing optical signals (S8, S11, T8, T10) carrying data to all the respective terminal sets (P1-1 . . . P1-16) and to all of the others of said nodes (N2, N4) connected directly thereto, said node comprising:

a receive transducer (2, 6) for transforming said incoming optical signal into an electrical reception signal (S4, T4);

an amplifier (8, 10) for amplifying said electrical reception signal (S4, T4) and producing an amplified electrical signal (S5, T5); and a transmit transducer (4) for transforming the amplified electrical signal (S5, T5) into an outgoing transmitted optical signal (T6, S6), each said receive transducer (2, 6, 104) or said transmit transducer (4, 102, 106) being a receive primary transducer (2, 104) or transmit primary transducer (4, 102), respectively, if the optical signal is transmitted via one of said primary fibers, each said receive transducer or said transmit transducer being a receive secondary transducer (6, 104) or transmit secondary transducer (4, 106), respectively, if the signal is transmitted via one of said secondary fibers;

wherein the receive primary transducers (2, 104) and the transmit primary transducers (4, 102) are tuned to two different respective wavelengths;

a single one of said primary fibers (FP1-1) connects each said terminal set (P1-1) to its associated node (N1);

said receive secondary transducers (6, 104) and said transmit secondary transducers (4, 106) are tuned to one of said two different respective wavelengths, said one of said two different respective wavelengths constituting a common wavelength;

a single secondary fiber (FN1-2) interconnects two of said nodes (N1, N2) when said two of said nodes are connected together directly;

said network further including means for preventing interference so that, when a first one of said nodes (N1) transmits an optical signal over a respective one of said secondary fibers (FN1-2, FN1-4), a further optical signal transmitted in response by a second one of said nodes (N2) cannot interfere with the operation of said first one of said nodes.

2. A network according to claim 1, wherein each of said nodes (N1) includes a common transducer (4, 104) tuned to said common wavelength, and constituting both a primary transducer and a secondary transducer.

3. A network according to claim 2, each of said plurality of terminal sets (P1-1 ... P4-16) having an optical connection terminal (16), each of said terminal sets including:

a transmitter (12) for receiving an input signal (S1) carrying data and transmitting a first message (S2) including the data; and a receiver (14) for receiving and processing a second message (S8, T10), the receiver supplying an output signal (S9, T11) accordingly;

said terminal sets being distributed in a plurality of groups of terminal sets (P1-1 ... P1-16), each group comprising at least one of said terminal sets;

at least some of said terminal sets being subscriber sets (P1-1 ... P1-16, P2-2 ... P4-16) connected to respective subscribers (A-1 ... A1-16, A2-2 ... A4-16) outside the network, so that each of said subscribers transmitting data to the other subscribers in said input signal (S1) to said subscriber set, and receiving the output signals (S9, T11) of said subscriber set so as to use the data therefrom, so that the input signals and the output signals of said subscriber sets respectively constitute input signals and output signals of the network;

the network further including:

a management member (A2-1) connected to the subscriber sets so that, at any given time, only one of the subscriber sets is allowed to transmit a message;

each of said nodes further including:

primary connection terminals B1 ... B16 for enabling messages to be interchanged between the node and the group of sets to which said node is connected, these messages being primary messages which are either incoming primary messages (S2) or outgoing primary messages (S8, T10) depending on whether they are received or transmitted by said node;

at least two secondary connection terminals (B17 ... B20) for enabling messages to be interchanged between said node and other said nodes (N2 ... N4), these messages being secondary messages which are either incoming secondary messages (T1) or outgoing secondary messages (S11, T8) depending on whether they are received or transmitted by said node, all of said primary messages and said secondary messages being in the form of optical signals constituted by modulations in optical carrier waves each having a message wavelength associated therewith;

each of said transmitters (12) or said receivers (14) of a respective one of said terminal sets being tuned to a respective message wavelength;

said primary fibers (FP-1 ... FP1-16) connecting a respective optical connection terminal (16) to respective ones of the primary connection terminals (B1 ... B16) of said node (N1) associated with said group of terminal sets, so that the messages transmitted by the group of terminal sets constitute the incoming primary messages of said node and so that the outgoing primary messages of said node are received by said group of terminal sets;

said secondary fibers (FN1-2, FN1-4), each of which interconnects two said secondary connection terminals belonging to respective ones of two of nodes (N1, N2, N4) so that the outgoing secondary messages of one of said nodes constitute the incoming secondary messages of the other said node;

wherein said incoming primary messages (S2) and said outgoing primary messages (S8, T10) respectively have a first wavelength and a second wavelength, the two wavelengths being different from each other and one of them constituting said common wavelength, said incoming secondary messages (T1) and said outgoing secondary messages (S11, T8) having said common wavelength;

each said terminal set (P1-1) further including:

a wavelength separator (18) connecting a respective optical connection terminal both to said transmitter (12) of the terminal set for said first wavelength, and to said receiver (14) of the terminal set for said second wavelength;

one of said primary connection terminals (B1) being connected to a respective one of said optical connection terminals (16) via one of said primary fibers (FP1-1);

each of said nodes further including:

a wavelength separator (20);

said primary receive transducer (2) being tuned to said first wavelength and connected to one of said primary connection terminals (B1) via at least said wavelength separator (20) for said first wavelength;

said primary transmit transducer (4) being tuned to said second wavelength and being connected to said primary terminal via at least said wavelength separator (20) for said second wavelength;

a passive optical coupler (22);

said secondary receive transducer (6) being tuned to said common wavelength and optically connected to said secondary connection terminal (B17) via said passive optical coupler (22);

said secondary transmit transducer (4) being tuned to said common wavelength and optically connected to said secondary connection terminal (B17) via said passive optical coupler (22).

4. A network according to claim 3, wherein said passive optical coupler (22) has two pairs of terminals (30, 32) (34, 36) for receiving an optical signal at at least one terminal of each of said pairs of terminals, said passive optical coupler splitting the signal so as to restore it in part at each of the two terminals of the other of said two pairs of terminals, said common transducer (4) being optically connected to said primary connection terminal (B1) of said node (N1) via said passive optical coupler (22) and said wavelength separator (20) in series so as to enable optical signals to be transmitted between said common transducer (4) and said primary connection terminal.

5. A network according to claim 3, wherein said wavelength separator (20) connects said common transducer (4) and said assigned transducer (2) assigned to the primary messages to a plurality of said primary connection terminals (B1 ... B16) of said node (N1) simultaneously via a primary passive optical divider (24).

6. A network according to claim 3, wherein said wavelength separator (20) connects said common transducer (4) and said assigned transducer (2) assigned to the primary messages to all of said primary connection terminals (B1 . . . B16) of said node (N1) simultaneously via a primary passive optical divider (24).

7. A network according to claim 3, wherein said passive optical coupler (22) connects said common transducer (4) and said assigned transducer (6) assigned to the secondary messages to a plurality of said secondary connection terminals (B17 ... B20) of said node (N1) via a secondary passive optical coupler (26).

8. A network according to claim 3, wherein said passive optical coupler (22) connects said common transducer (4) and said assigned transducer (6) assigned to the secondary messages to all of said secondary connection terminals (B17 ... B20) of said node (N1) via a secondary passive optical divider (26).

9. A network according to claim 3, wherein said secondary fibers (FN1-2, FN1-10, F2-3, FN2-4) have a lower coefficient of absorption for said common wavelength than for the other of said two wavelengths.

* * * * *